US008675050B2

(12) United States Patent
Sakaguchi et al.

(10) Patent No.: US 8,675,050 B2
(45) Date of Patent: Mar. 18, 2014

(54) DATA STRUCTURE, RECORDING APPARATUS AND METHOD, PLAYBACK APPARATUS AND METHOD, AND PROGRAM

(75) Inventors: Tatsumi Sakaguchi, Kanagawa (JP); Takafumi Morifuji, Tokyo (JP)

(73) Assignee: Sony Corporation, Tokyo (JP)

( * ) Notice: Subject to any disclaimer, the term of this patent is extended or adjusted under 35 U.S.C. 154(b) by 334 days.

(21) Appl. No.: 12/984,218

(22) Filed: Jan. 4, 2011

(65) Prior Publication Data

US 2011/0169926 A1 Jul. 14, 2011

(30) Foreign Application Priority Data

Jan. 13, 2010 (JP) ................ P2010-004549

(51) Int. Cl.
*H04N 13/00* (2006.01)
(52) U.S. Cl.
USPC .................. 348/51; 382/154; 348/43; 348/54
(58) Field of Classification Search
USPC .................................................... 348/42–60
See application file for complete search history.

(56) References Cited

U.S. PATENT DOCUMENTS

| 4,600,200 A * | 7/1986 | Oka et al. ........................ 463/33 |
| 8,089,507 B2 * | 1/2012 | Ikeda et al. ..................... 348/43 |
| 8,094,927 B2 * | 1/2012 | Jin et al. ........................ 382/154 |
| 2004/0233275 A1 * | 11/2004 | Tomita ............................ 348/51 |
| 2007/0121076 A1 * | 5/2007 | Klippstein et al. .............. 353/30 |
| 2010/0039504 A1 * | 2/2010 | Takahashi et al. .............. 348/54 |

FOREIGN PATENT DOCUMENTS

JP          10-327430         12/1998

* cited by examiner

*Primary Examiner* — Dave Czekaj
*Assistant Examiner* — MD Haque
(74) *Attorney, Agent, or Firm* — Finnegan, Henderson, Farabow, Garrett & Dunner, LLP

(57) ABSTRACT

A recording apparatus includes a recording controller configured to record picture data of a 3D picture and viewing environment information indicating an environment intended as a viewing environment for the 3D picture on a recording medium.

19 Claims, 10 Drawing Sheets

DATA STRUCTURE, RECORDING APPARATUS AND METHOD, PLAYBACK APPARATUS AND METHOD, AND PROGRAM

BACKGROUND OF THE INVENTION

1. Field of the Invention

The present invention relates to data structures, recording apparatuses and methods, playback apparatuses and methods, and programs, and more particularly to a data structure, a recording apparatus and method, a playback apparatus and method, and a program that are configured to provide a viewer with a 3D picture intended by a creator of the 3D picture regardless of a viewing environment.

2. Description of the Related Art

Although 2D pictures are mainly used for content such as movies, 3D pictures are gaining increased attention these days.

A playback apparatus that plays back such 3D pictures provides the viewer with a 3D picture by playing back and displaying a picture for the left eye and a picture for the right eye, between which a predetermined amount of parallax is provided (for example, Japanese Unexamined Patent Application Publication No. 10-327430).

SUMMARY OF THE INVENTION

However, the amount of parallax between a picture for the left eye and a picture for the right eye, that is, a distance in the depth direction, which is a direction perpendicular to a screen displaying a 3D picture, is determined by a creator of the 3D picture so as to be optimum in an intended viewing environment. Therefore, when an actual viewing environment is much different from the viewing environment intended by the creator, if a playback apparatus plays back and displays the 3D picture as is, a viewer may feel tired or mental or physical discomfort. In addition, the viewer may feel that the 3D picture looks bland or artificial.

For example, as illustrated in FIG. 1, when a 3D picture created for a viewing environment such as a movie theater (hereinafter referred to as a picture for a theater) in which a large screen is viewed from a distance (hereinafter referred to as a theater environment) is viewed in a viewing environment such as a living room in which a relatively small screen is viewed from a close range (hereinafter referred to as a living room environment), if the picture for a theater is simply subjected to a size conversion corresponding to a screen size, the position of the picture for a theater in the depth direction when the picture for a theater is viewed in the living room environment is different from that when the picture for a theater is viewed in the theater environment.

Therefore, a viewer in the living room environment may not experience a natural 3D effect intended by the creator and may feel tired or mental or physical discomfort. The viewer may also feel that the 3D picture looks bland or artificial.

Accordingly, it is desirable to provide the viewer with a 3D picture intended by the creator regardless of the viewing environment.

A data structure according to a first embodiment of the present invention includes picture data of a 3D picture and viewing environment information indicating an environment intended as a viewing environment for the 3D picture.

According to the first embodiment of the present invention, the picture data of the 3D picture and the viewing environment information indicating the environment intended as the viewing environment for the 3D picture are included.

A recoding apparatus according to a second embodiment of the present invention includes recording control means for recording picture data of a 3D picture and viewing environment information indicating an environment intended as a viewing environment for the 3D picture on a recording medium.

A recording method and a program according to the second embodiment of the present invention correspond to the recording apparatus according to the second embodiment of the present invention.

According to the second embodiment of the present invention, the picture data of the 3D picture and the viewing environment information indicating the environment intended as the viewing environment for the 3D picture are recorded on the recording medium.

A playback apparatus according to a third embodiment of the present invention includes readout means for reading out picture data of a 3D picture and viewing environment information indicating an environment intended as a viewing environment for the 3D picture from a recording medium that stores the picture data and the viewing environment information, and provision means for providing a viewer with a 3D picture approximate to the 3D picture that can be viewed in the viewing environment indicated by the viewing environment information on the basis of the viewing environment information and information indicating a current viewing environment.

A playback method and a program according to the third embodiment of the present invention correspond to the playback apparatus according to the third embodiment of the present invention.

According to the third embodiment of the present invention, the picture data of the 3D picture and the viewing environment information indicating the environment intended as the viewing environment for the 3D picture are read out from the recording medium that stores the picture data and the viewing environment information, and the viewer is provided with the 3D picture approximate to the 3D picture that can be viewed in the viewing environment indicated by the viewing environment information on the basis of the viewing environment information and the information indicating the current viewing environment.

According to the first and second embodiments of the present invention, the viewing environment information of the 3D picture can be provided along with the picture data of the 3D picture. Therefore, the viewer can be provided with the 3D picture intended by the creator regardless of the viewing environment when the 3D picture is played back.

In addition, according to the third embodiment of the present invention, the viewer can be provided with the 3D picture intended by the creator regardless of the viewing environment.

DESCRIPTION OF THE PREFERRED EMBODIMENTS

Configuration Example of Recording Apparatus According to Embodiment

Figure 1:
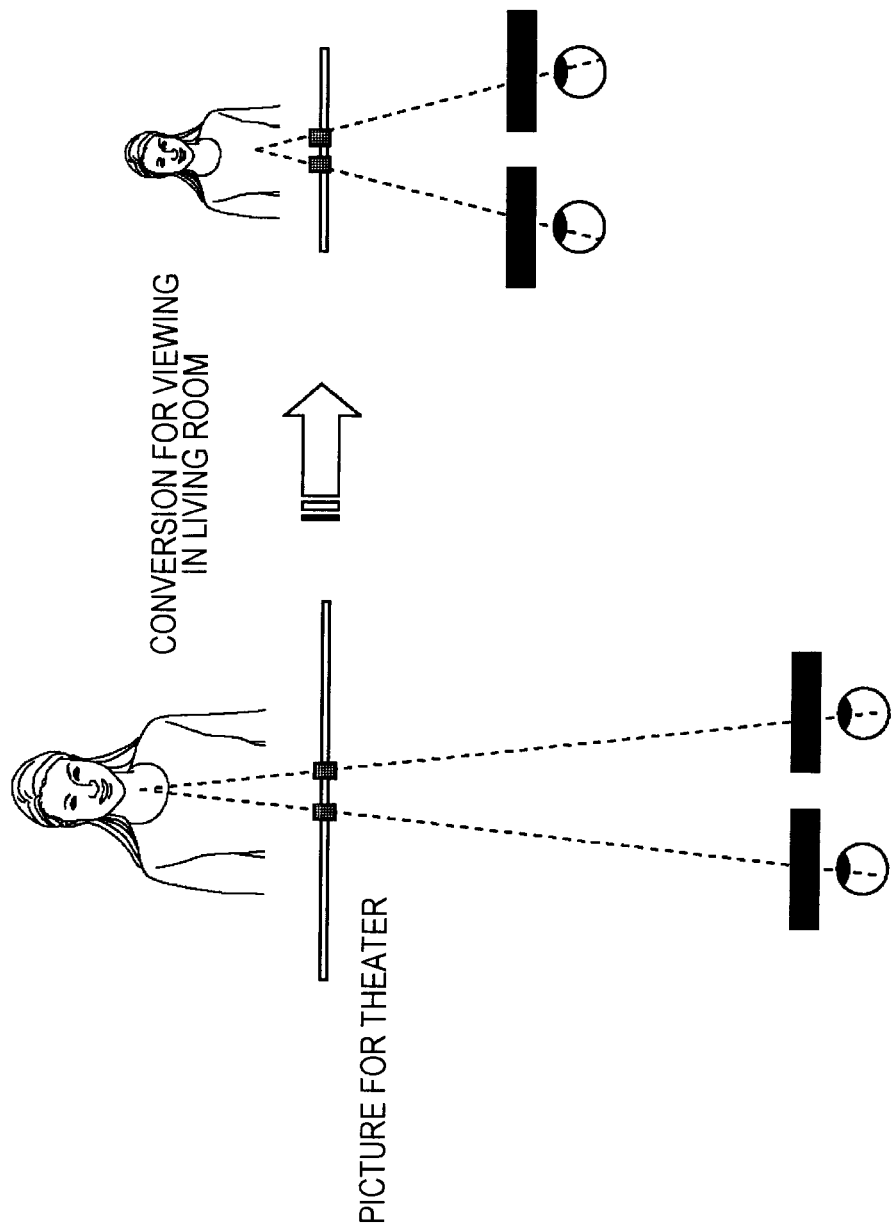
FIG. 1 is a diagram illustrating a change in a 3D picture between different viewing environments.
Figure 2:
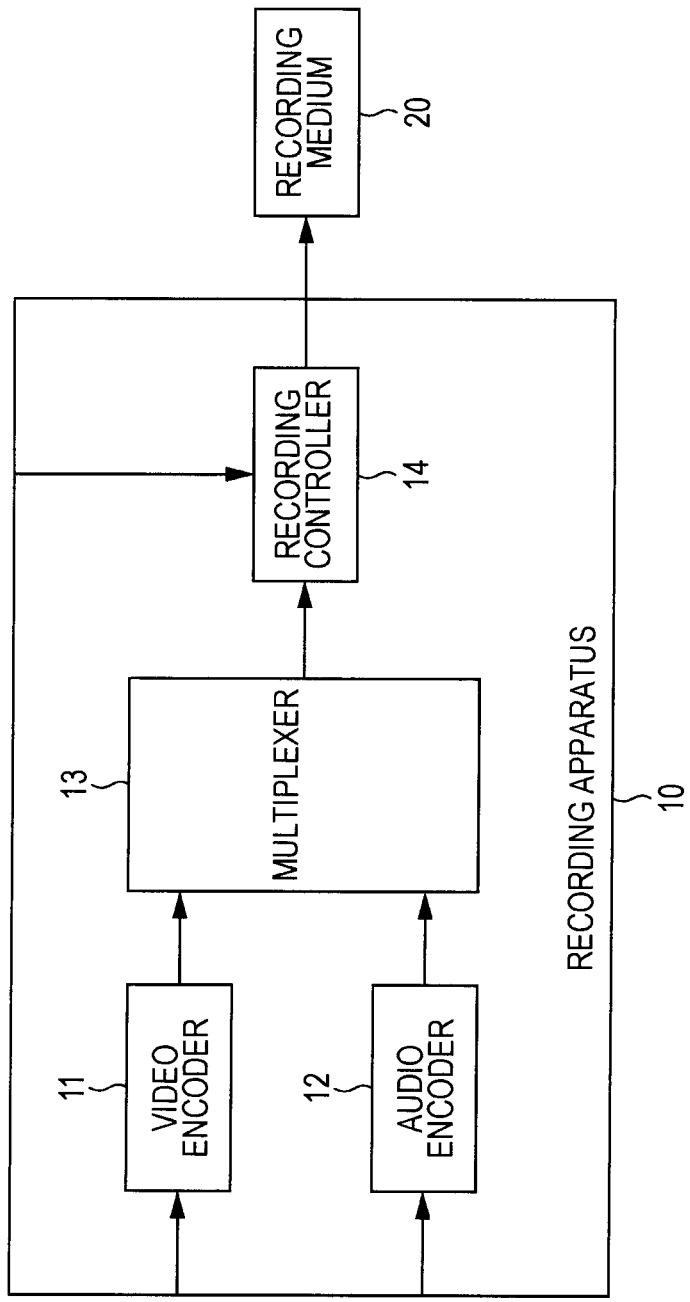
FIG. 2 is a block diagram illustrating a configuration example of a recording apparatus according to an embodiment of the present invention.

FIG. 2 is a block diagram illustrating a configuration example of a recording apparatus according to an embodiment of the present invention.

A recording apparatus 10 illustrated in FIG. 2 includes a video encoder 11, an audio encoder 12, a multiplexer 13, and a recording controller 14. The recording apparatus 10 encodes video data of a 3D picture (hereinafter referred to as 3D video data) and audio data corresponding to the video data in order to record the video data and the audio data on a recording medium 20, which is a non-transitory computer-readable medium, such as a Blu-ray Disc® read only memory (BD-ROM). The recording apparatus 10 also records viewing environment information indicating an environment intended as a viewing environment for the 3D picture on the recording medium 20.

More specifically, the video encoder 11 in the recording apparatus 10 encodes 3D video data input from the outside using an encoding format such as Moving Picture Experts Group phase 2 (MPEG-2), MPEG-4, or Advanced Video Coding (AVC). The video encoder 11 supplies a video stream, which is an elementary stream (ES) obtained as a result of the encoding, to the multiplexer 13.

The audio encoder 12 encodes audio data that has been input from the outside and that corresponds to the 3D video data using an encoding format such as MPEG, and supplies an audio stream, which is an ES obtained as a result of the encoding, to the multiplexer 13.

The multiplexer 13 multiplexes the video stream supplied from the video encoder 11 and the audio stream supplied from the audio encoder 12 and supplies a multiplexed stream obtained as a result of the multiplexing to the recording controller 14.

The recording controller 14 records viewing environment information input from the outside on the recording medium 20 as a definition file. Thus, since the viewing environment information is recorded on the recording medium 20 as a definition file, a viewer can be offered the viewing environment information when the recording medium 20 is inserted into a playback apparatus and starts being played back.

The viewing environment information is input by, for example, a creator of the video data and the audio data through operation of an input unit, which is not illustrated. In addition, the viewing environment information may be recorded on the recording medium 20 as a file on a menu screen instead of as a definition file. In that case, pictures and letters for indicating the viewing environment information may be recorded as a picture file on the menu screen or audio data of sound for indicating the viewing environment information may be recorded as an audio file on the menu screen.

The recording controller 14 also records the multiplexed stream supplied from the multiplexer 13 on the recording medium 20.

Example of Viewing Environment Information

Figure 3:
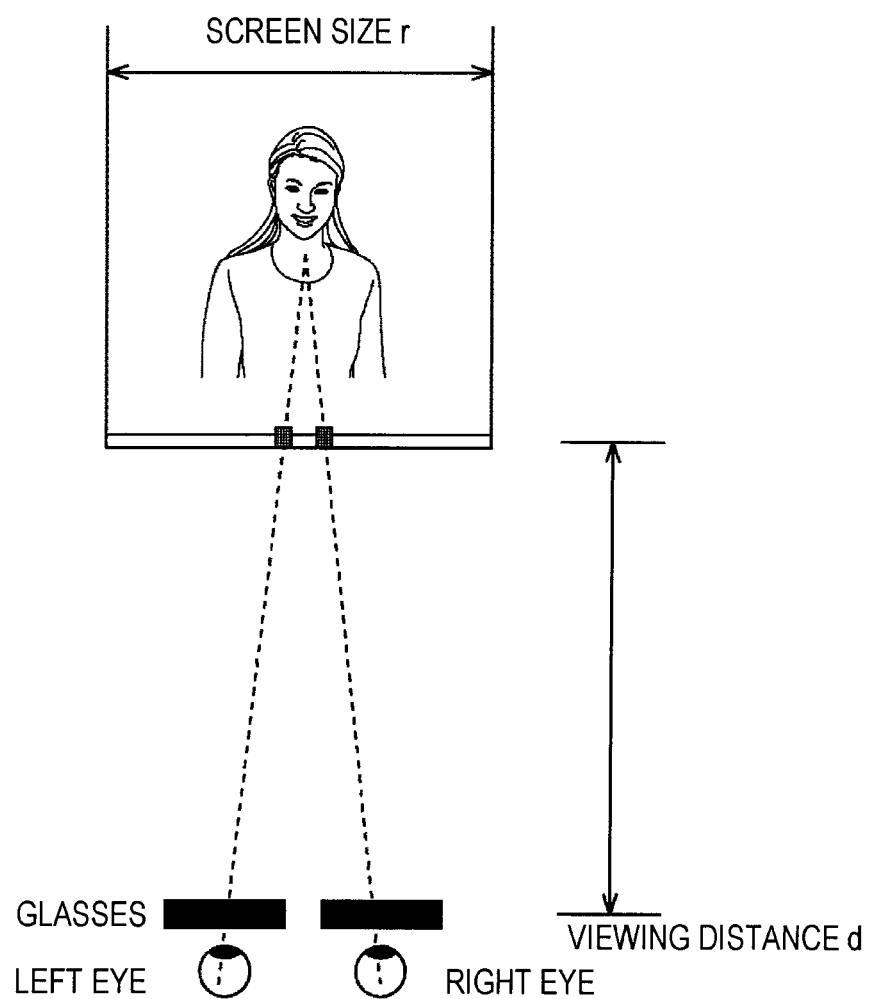
FIG. 3 is a diagram illustrating an example of viewing environment information.
Figure 4:
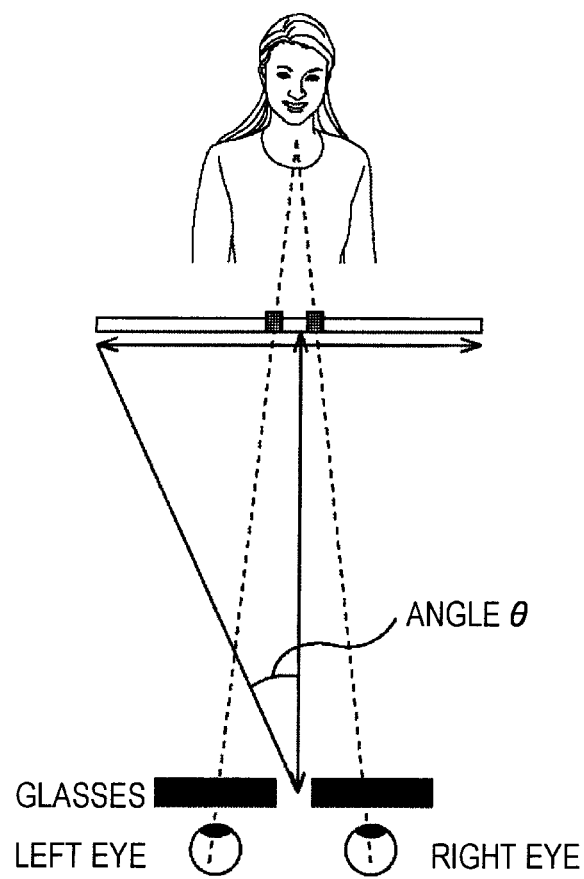
FIG. 4 is a diagram illustrating another example of the viewing environment information.

FIGS. 3 and 4 are diagrams illustrating examples of the viewing environment information.

In the examples of FIGS. 3 and 4, the aspect ratio of a display unit for displaying a 3D picture is fixed and the same as that intended by the creator of the 3D picture.

As illustrated in FIG. 3, the viewing environment information includes, for example, a screen size r and a viewing distance d, which is a distance from the viewer to the display unit. The screen size r herein refers to the length of a diagonal of a display region of the display unit, but the screen size r is not limited to that so long as the screen size r indicates the size of the display region. For example, the screen size r may be the lengths of the display region in the horizontal (left and right) direction and the vertical (up and down) direction.

In addition, as illustrated in FIG. 4, the viewing environment information may include an angle in the horizontal direction θ formed between the viewer and an edge in the horizontal direction, namely a left or right edge, of the display unit.

In FIGS. 3 and 4, since the aspect ratio of the display unit is fixed and the same as that intended by the creator of the 3D picture, the aspect ratio is not included in the viewing environment information. If the aspect ratio is variable, an aspect ratio a of the display unit is included in the viewing environment information.

In addition, the viewing environment information may also include an angle in the vertical direction θv formed between the viewer and an edge in the vertical direction, namely a top or bottom edge, of the display unit. Furthermore, the viewing environment information may include the brightness of the surroundings during viewing, a distance between cameras that shot a picture for the left eye and a picture for the right eye, which together form the 3D picture, and the like.

Description of Process Performed by Recording Apparatus

Figure 5:
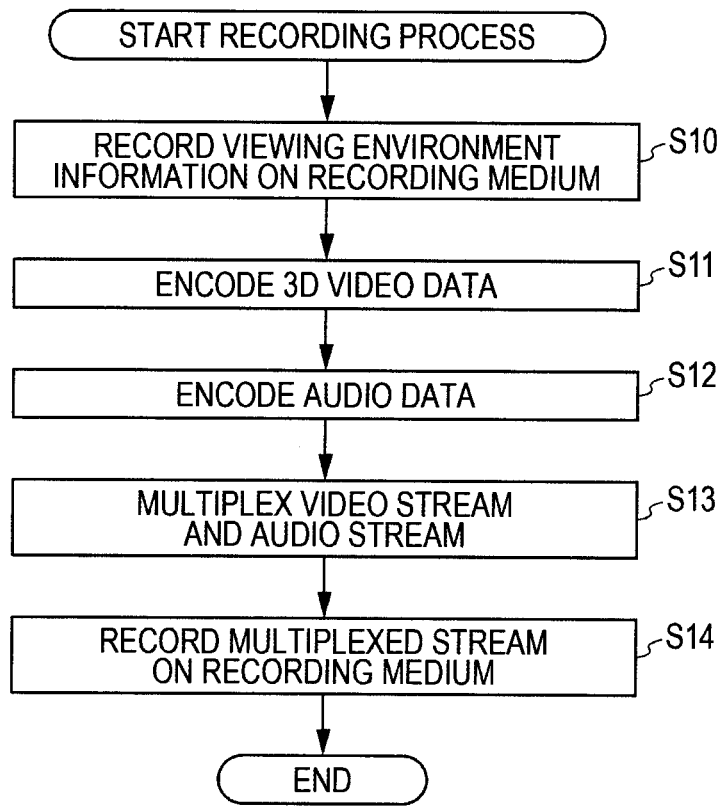
FIG. 5 is a flowchart illustrating a recording process performed by the recording apparatus.

FIG. 5 is a flowchart illustrating a recording process performed by the recording apparatus 10 illustrated in FIG. 2. The recording process begins when, for example, the viewing environment information, the 3D video data, and the audio data are input.

In step S10, the recording controller 14 records the viewing environment information input from the outside on the recording medium 20 as a definition file.

In step S11, the video encoder 11 encodes the 3D video data input from the outside using an encoding format such as MPEG-2, MPEG-4, or AVC. The video encoder 11 then supplies a video stream obtained as a result of the encoding to the multiplexer 13.

In step S12, the audio encoder 12 encodes the audio data that is input from the outside and that corresponds to the 3D video data using an encoding format such as MPEG, and supplies an audio stream obtained as a result of the encoding to the multiplexer 13.

In step S13, the multiplexer 13 multiplexes the video stream supplied from the video encoder 11 and the audio stream supplied from the audio encoder 12 and supplies a multiplexed stream obtained as a result of the multiplexing to the recording controller 14.

In step S14, the recording controller 14 records the multiplexed stream supplied from the multiplexer 13 on the recording medium 20 and terminates the process.

Description of Other Methods for Recording Viewing Environment Information

Figure 6:
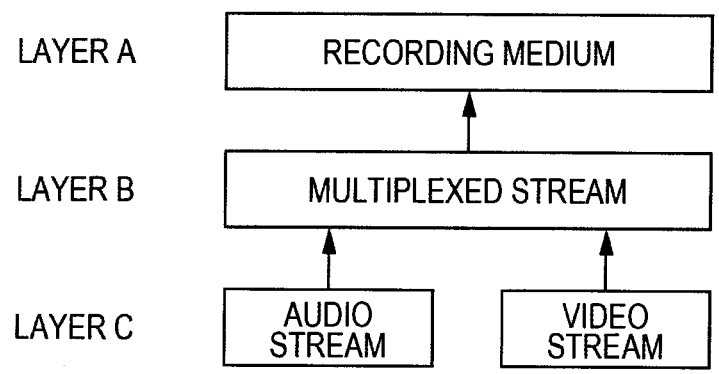
FIG. 6 is a diagram illustrating a hierarchical structure of data recorded on a recording medium.

FIG. 6 is a diagram illustrating a hierarchical structure of data recorded on the recording medium 20.

FIG. 6 illustrates the hierarchy of the data recorded on the recording medium 20, that is, a layer C, which includes ESs such as audio streams and video streams, a system layer B, which includes multiplexed streams, a layer A, which includes information found only on the recording medium 20, and the like.

Although the viewing environment information is recorded as a definition file in the layer A in the above description, the viewing environment information may be recorded in the system layer B or the layer C.

For example, when the viewing environment information is recorded in the layer C, if the encoding format is AVC, the viewing environment information is recorded as supplemental enhancement information (SEI) or as part of a sequence parameter set (SPS) or a picture parameter set (PPS). If the encoding format is MPEG-2, the viewing environment information is recorded as a video sequence or as extension and user data.

In that case, the viewing environment information can be altered in a single video stream. As a result, even if video streams of 3D pictures that are intended for different viewing environments are recorded on a single recording medium 20, each piece of the viewing environment information can be provided for a playback apparatus.

In addition, when the viewing environment information is recorded in the layer B, the viewing environment information is recorded in a private packet of a transport stream (TS), a private pack of a program stream (PS), an extended area of a box included in configuration (config) information of MPEG-4, or the like.

Figure 7:
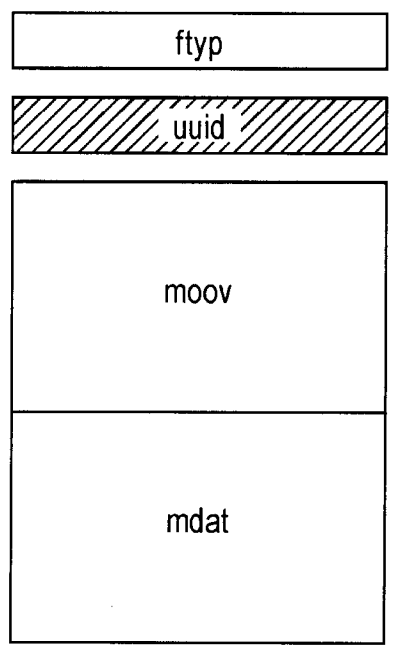
FIG. 7 is a diagram illustrating an example of an extended area of a box of MPEG-4.

As illustrated in FIG. 7, the extended area of the box of MPEG-4 in which the viewing environment information is recorded is, for example, provided in a private extension box ("uuid" of FIG. 7) located immediately after an ftyp box, which is a first box in a file. In that case, the playback apparatus can obtain the viewing environment information before a decoding process, but the viewing environment information is not altered in the file.

In the private extension box, not only the viewing environment information, but also information indicating the type of codec, bit rate, frame size, aspect ratio, whether the picture is 2D or 3D, and the like is written.

Figure 8:
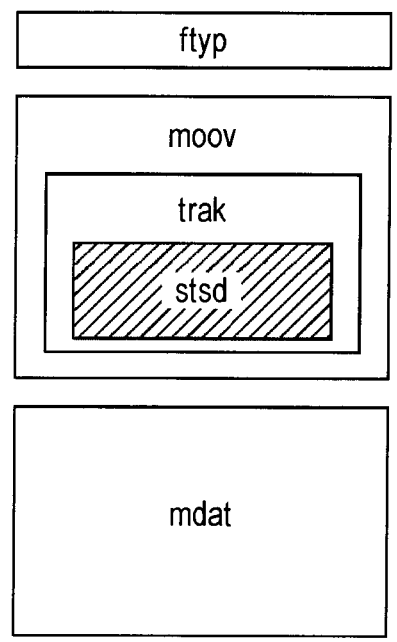
FIG. 8 is a diagram illustrating another example of the extended area of the box of MPEG-4.

In addition, as illustrated in FIG. 8, the extended area of the box of MPEG-4 in which the viewing environment information is recorded may be provided in a track information (trak) area ("stsd" of FIG. 8) of a moov box. In that case, information indicating the area of the viewing environment information to be referred to is contained in the video stream, and the playback apparatus obtains the viewing environment information on the basis of the information. Therefore, the viewing environment information can be made altered in the video stream in this case. However, accessibility is worse than in the case illustrated in FIG. 7.

Figure 9:
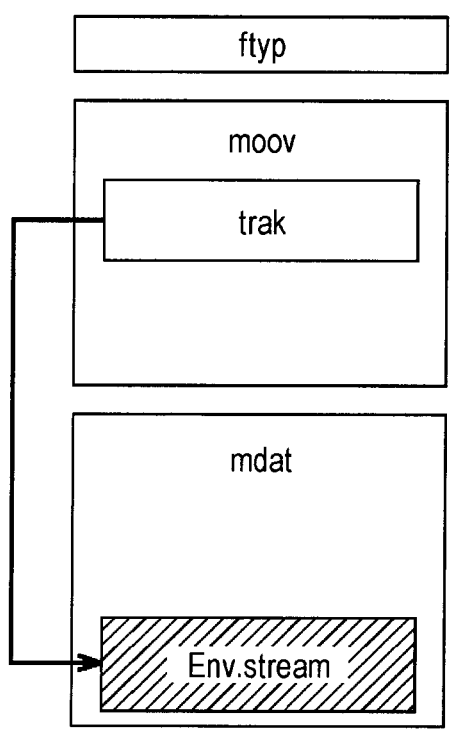
FIG. 9 is a diagram illustrating yet another example of the extended area of the box of MPEG-4.

Furthermore, as illustrated in FIG. 9, the extended area of the box of MPEG-4 in which the viewing environment information is recorded may be provided in an mdat box. That is, the viewing environment information may be recorded as a single media stream. In that case, because the video stream and the viewing environment information are synchronized using time information, it is possible to change the viewing environment information every moment.

Although the moov box and the mdat box are arranged after the ftyp box in this order in the examples of FIGS. 7 to 9, the arrangement of the moov box and the mdat box is not limited to this.

Configuration Example of Playback Apparatus

Figure 10:
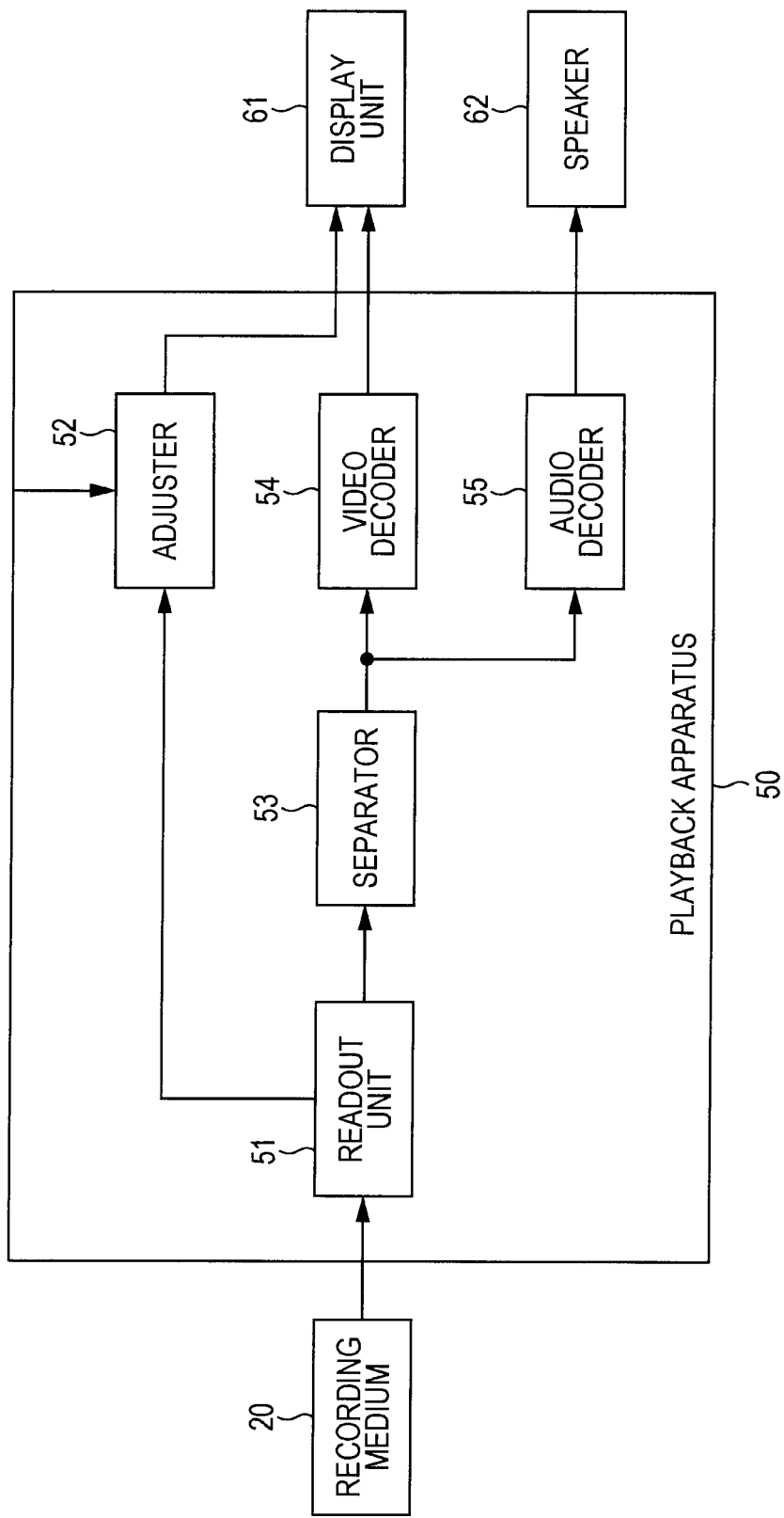
FIG. 10 is a block diagram illustrating a configuration example of a playback apparatus that plays back the recording medium.

FIG. 10 is a block diagram illustrating a configuration example of a playback apparatus for playing back the recording medium 20 on which recording has been made by the recording apparatus 10 illustrated in FIG. 2.

A playback apparatus 50 illustrated in FIG. 10 includes a readout unit 51, an adjuster 52, a separator 53, a video decoder 54, and an audio decoder 55. On the basis of the viewing environment information recorded on the recording medium 20, the playback apparatus 50 displays guidance information for guiding the viewer to establish the current viewing environment as a viewing environment intended by the creator.

More specifically, the readout unit 51 in the playback apparatus 50 reads out viewing environment information recorded on the recording medium 20 and supplies the viewing environment information to the adjuster 52. The readout unit 51 also reads out a multiplexed stream recorded on the recording medium 20 and supplies the multiplexed stream to the separator 53.

The adjuster 52 (provision means) provides the viewer with a 3D picture approximate to a 3D picture that can be viewed in a viewing environment indicated by the viewing environment information and that corresponds to the multiplexed stream, on the basis of the viewing environment information supplied from the readout unit 51 and information indicating the current viewing environment that is input from the outside.

More specifically, the adjuster 52 generates the guidance information on the basis of the viewing environment information and a screen size r' of a display unit 61 input from the outside as the information indicating the current viewing environment.

For example, the adjuster 52 obtains a viewing distance d' that is necessary for viewing the 3D picture displayed on the display unit 61 in the viewing environment intended by the creator by calculating an expression $d'=(r'/r)d$. After that, the adjuster 52 generates a message such as "please view from a position other viewing distance d'>> away from the display unit 61" as the guidance information.

The adjuster 52 then supplies the guidance information to the display unit 61, so that the guidance information is displayed. Thus, the viewing environment of the viewer is changed to that intended by the creator and therefore the viewer can view the 3D picture that can be viewed in the viewing environment intended by the creator.

The screen size r' may be input, for example, from the display unit 61 through High-Definition Multimedia Interface (HDMI) or by an operation of an input unit, which is not illustrated, performed by the viewer.

The separator 53 separates the multiplexed stream supplied from the readout unit 51 into a video stream and an audio stream. The separator 53 then supplies the video stream to the video decoder 54 and the audio stream to the audio decoder 55.

The video decoder 54 decodes the video stream supplied from the separator 53 using a format corresponding to the encoding format of the video encoder 11 illustrated in FIG. 2 and supplies 3D video data obtained as a result of the decoding to the display unit 61.

The audio decoder 55 decodes the audio stream supplied from the separator 53 using a format corresponding to the encoding format of the audio encoder 12 illustrated in FIG. 2 and supplies audio data obtained as a result of the decoding to a speaker 62.

The display unit 61 displays the guidance information supplied from the adjuster 52. The display unit 61 also displays a picture for the left eye and a picture for the right eye that correspond to the video data supplied from the video decoder 54 by, for example, time-sharing. In that case, the viewer wears, for example, 3D shutter glasses synchronized with the switching between the picture for the left eye and the picture for the right eye, so that the picture for the left eye is viewed only by the left eye and the picture for the right eye is viewed only by the right eye. Thus, the viewer can view a 3D picture.

The speaker 62 outputs sound corresponding to the audio data supplied from the audio decoder 55.

Description of Process Performed by Playback Apparatus

Figure 11:
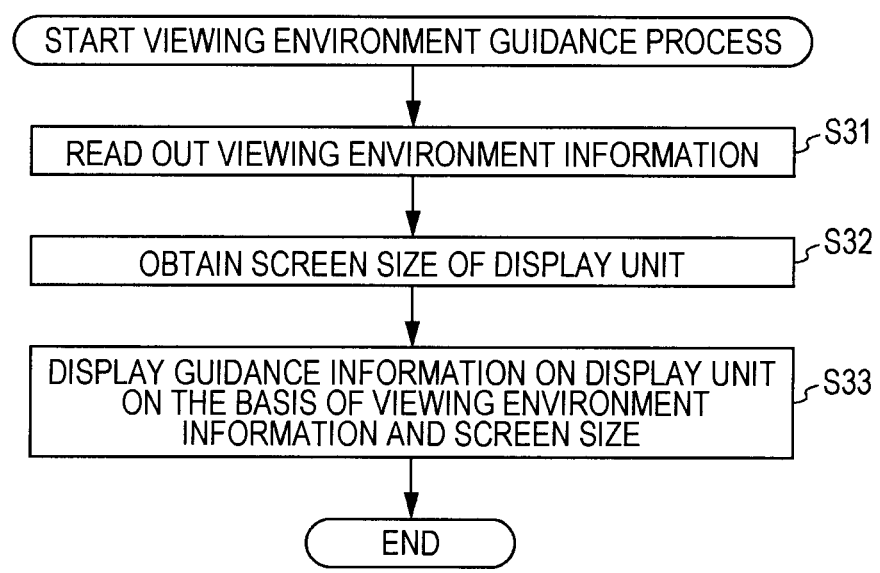
FIG. 11 is a flowchart illustrating a viewing environment guidance process performed by the playback apparatus.

FIG. 11 is a flowchart illustrating a viewing environment guidance process performed by the playback apparatus 50 illustrated in FIG. 10. The viewing environment guidance process begins when, for example, the viewer instructs playback of a multiplexed stream recorded on the recording medium 20.

In step S31, the readout unit 51 reads out the viewing environment information from the recording medium 20 and supplies the viewing environment information to the adjuster 52.

In step S32, the adjuster 52 obtains the screen size r' of the display unit 61 from the outside.

In step S33, the adjuster 52 generates guidance information on the basis of the viewing environment information supplied from the readout unit 51 and the screen size r' of the display unit 61 input from the outside, and supplies the guidance information to the display unit 61, so that the guidance information is displayed. The process then terminates.

In the above description, the screen size r' is input to the playback apparatus 50. If the screen size r' is not input, the adjuster 52 makes the display unit 61 display the viewing environment information itself as the guidance information.

In addition, when the current viewing distance is measured by a measurement apparatus provided outside, which is not illustrated, and the screen size r' and the viewing distance d' are input as the information indicating the current viewing environment, the adjuster 52 may, on the basis of a difference between the viewing distance d and the viewing distance d', generate a message such as "please move forward (backward) a distance of >>the difference>> before viewing" as the guidance information.

Furthermore, the adjuster 52 may perform a predetermined picture process on the 3D video data on the basis of the viewing environment information and the information indicating the current viewing environment, generate data of a 3D picture approximate to a 3D picture that can be viewed in the viewing environment indicated by the viewing environment information and that corresponds to the 3D video data (hereinafter referred to as approximate data), and make the display unit 61 display the 3D picture based on the approximate data.

In that case, the adjuster 52 generates the approximate data by, for example, increasing or decreasing the picture size of the 3D video data or adjusting the parallax of the 3D video data on the basis of the viewing environment information and the information indicating the current viewing environment.

In addition, the adjuster 52 may provide the viewer with a 3D picture approximate to the 3D picture that can be viewed in the viewing environment indicated by the viewing environment information by controlling the enlargement or reduction ratio of the glasses that are worn by the viewer and have zoom-in and zoom-out functions on the basis of the viewing environment information and the information indicating the current viewing environment.

As described above, since the multiplexed stream and the viewing environment information are written on the recording medium 20, it is possible for a playback apparatus for playing back the recording medium 20 to, on the basis of the viewing environment information, guide the viewer to establish the current viewing environment as the viewing environment intended by the creator of the multiplexed stream and correct 3D video data so that the viewer can view a 3D picture approximate to the 3D picture that can be viewed in the viewing environment intended by the creator. Thus, the playback apparatus can provide the viewer with the 3D picture intended by the creator regardless of the viewing environment. As a result, the viewer can experience a natural 3D effect intended by the creator. Therefore, it is possible to reduce the instances in which the viewer feels tired or mental or physical discomfort, or feels that the 3D picture looks bland or artificial.

Description of Computer According to Embodiment of Present Invention

A series of the processes described above can be performed using either hardware or software. When a series of the processes are performed using software, a program that forms the software is installed in a general-purpose computer or the like.

Figure 12:
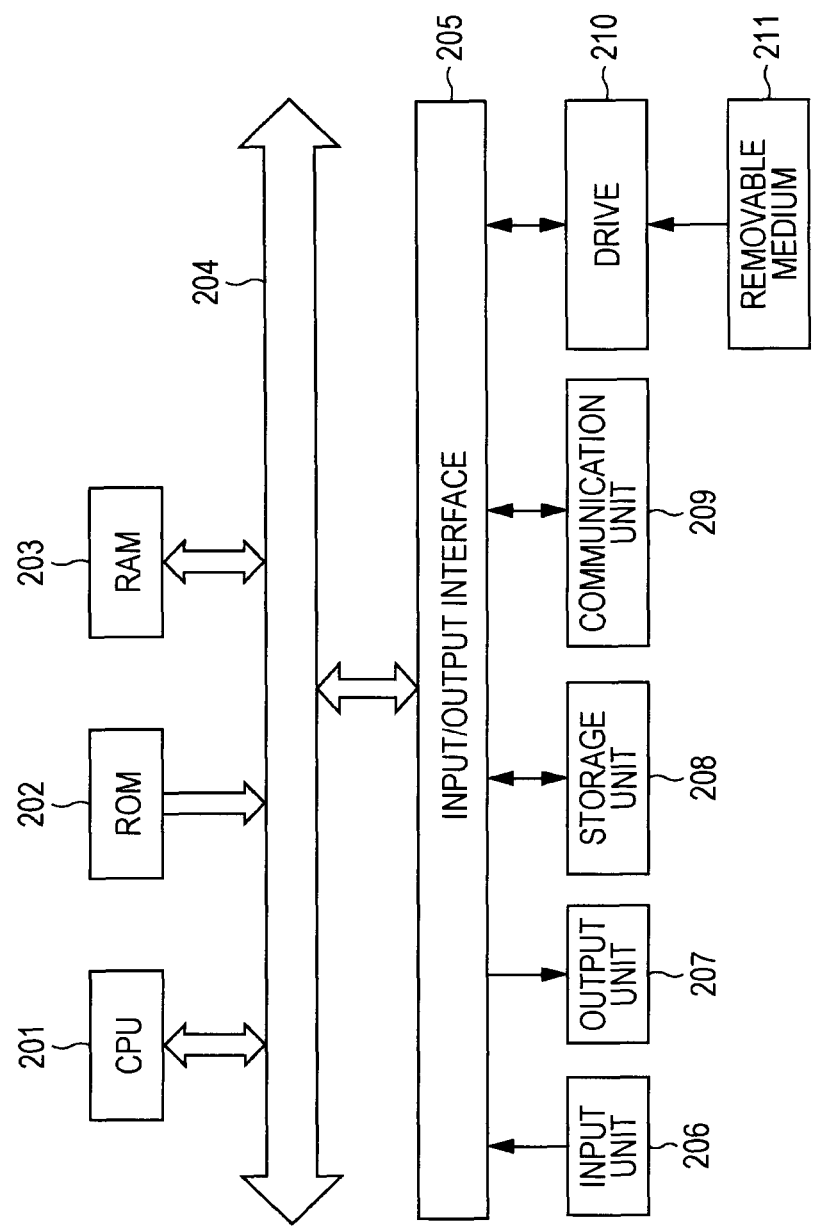
FIG. 12 is a diagram illustrating a configuration example of a computer according to an embodiment of the present invention.

FIG. 12 illustrates a configuration example of a computer according to an embodiment of the present invention in which a program that executes a series of the processes described above is installed.

The program can be recorded in advance in a storage unit 208, which is a recording medium incorporated in the computer, or on a read only memory (ROM) 202. Each of storage unit 208 and ROM 202 is a non-transitory computer-readable medium.

The program can also be stored (recorded) in a removable medium 211. The removable medium 211 can be provided as so-called package software. The removable medium 211 herein may be a non-transitory computer-readable medium, for example, a flexible disc, a compact disc read only memory (CD-ROM), a magneto optical (MO) disc, a digital versatile disc (DVD), a magnetic disk, a semiconductor memory, or the like.

Not only can the program be installed in a computer from the removable medium 211 described above through a drive 210, but the program can also be downloaded onto the computer through a communication network or a broadcasting network and installed in the storage unit 208 incorporated in the computer. That is, the program can be, for example, wirelessly transferred from a download site to a computer through an artificial satellite for digital satellite broadcasting, or transferred by wire to the computer using a network such as a local area network (LAN) or the Internet.

The computer incorporates a central processing unit (CPU) 201, and an input/output interface 205 is connected to the CPU 201 through a bus 204.

The CPU 201 executes a program stored in the ROM 202 in accordance with an instruction when the instruction is input through the input/output interface 205 by an operation of the input unit 206 or the like performed by a user. The CPU 201 may load a program stored in the storage unit 208 into a random access memory (RAM) 203 and execute the program, instead.

Thus, the CPU 201 performs the process according to the flowchart described above or the process executed on the basis of the configuration of the block diagram described above. The CPU 201 then, for example, outputs the result of the process from an output unit 207; transmits the result of the process from a communication unit 209; or records the result of the process on the storage unit 208 as necessary, through the input/output interface 205.

The input unit 206 includes a keyboard, a mouse, and a microphone. The output unit 207 includes a liquid crystal display (LCD) and a speaker.

It is to be noted that a process performed by the computer in accordance with a program is not necessarily performed chronologically in the order specified by the flowchart. That is, a process performed by the computer in accordance with a program includes a process performed in parallel or individually (e.g., parallel processing or a process performed by an object).

In addition, a program may be processed by a single computer (processor) or may be subjected to distributed processing performed by a plurality of computers. Furthermore, a program may be transferred to a distant computer and executed by the distant computer.

The present application contains subject matter related to that disclosed in Japanese Priority Patent Application JP 2010-004549 filed in the Japan Patent Office on Jan. 13, 2010, the entire contents of which are hereby incorporated by reference.

It should be understood that embodiments of the present invention are not limited to those described above and various modifications may occur insofar as they are within the scope of the present invention.

What is claimed is:

1. A non-transitory computer-readable medium storing a data structure, the data structure comprising:
    picture data of a 3D picture; and
    viewing environment information indicating an intended viewing environment for the 3D picture,
    wherein the viewing environment information enables a playback apparatus to provide a viewer with an adjusted 3D picture approximate to the 3D picture included in the data structure by controlling a viewing function of viewing glasses worn by the viewer based on the viewing environment information indicating the intended viewing environment and information indicating a current viewing environment, and
    wherein the adjusted 3D picture to be viewed in the current viewing environment enables the viewer to experience a 3D effect that is intended when viewing the 3D picture included in the data structure in the intended viewing environment.

2. The non-transitory computer-readable medium according to claim 1, wherein the viewing environment information includes a size of a display unit that displays the 3D picture included in the data structure and a viewing distance, which is a distance from the display unit to a viewer.

3. The non-transitory computer-readable medium according to claim 1, wherein the viewing environment information includes an angle in a horizontal direction formed between a viewer and an edge in a horizontal direction of a display unit that displays the 3D picture included in the data structure.

4. A recording apparatus comprising:
    recording control means for recording picture data of a 3D picture and viewing environment information indicating an intended viewing environment for the 3D picture on a recording medium,
    wherein the viewing environment information enables a playback apparatus to provide a viewer with an adjusted 3D picture approximate to the recorded 3D picture by controlling a viewing function of viewing glasses worn by the viewer based on the viewing environment information indicating the intended viewing environment and information indicating a current viewing environment, and
    wherein the adjusted 3D picture to be viewed in the current viewing environment enables the viewer to experience a 3D effect that is intended when viewing the recorded 3D picture in the intended viewing environment.

5. The recording apparatus according to claim 4, wherein the viewing environment information includes a size of a display unit that displays the recorded 3D picture and a viewing distance, which is a distance from the display unit to a viewer.

6. The recording apparatus according to claim 4, wherein the viewing environment information includes an angle in a horizontal direction formed between a viewer and an edge in a horizontal direction of a display unit that displays the recorded 3D picture.

7. A recording method for a recording apparatus, comprising the step of:
    recording picture data of a 3D picture and viewing environment information indicating an intended viewing environment for the 3D picture on a recording medium,
    wherein the viewing environment information enables a playback apparatus to provide a viewer with an adjusted 3D picture approximate to the recorded 3D picture by controlling a viewing function of viewing glasses worn by the viewer based on the viewing environment information indicating the intended viewing environment and information indicating a current viewing environment, and
    wherein the adjusted 3D picture to be viewed in the current viewing environment enables the viewer to experience a 3D effect that is intended when viewing the recorded 3D picture in the intended viewing environment.

8. A non-transitory computer-readable medium storing a program for causing a computer to execute a process, the process comprising the step of:
    recording picture data of a 3D picture and viewing environment information indicating intended viewing environment for the 3D picture on a recording medium,
    wherein the viewing environment information enables a playback apparatus to provide a viewer with an adjusted 3D picture approximate to the recorded 3D picture by controlling a viewing function of viewing glasses worn by the viewer based on the viewing environment information indicating the intended viewing environment and information indicating a current viewing environment, and
    wherein the adjusted 3D picture to be viewed in the current viewing environment enables the viewer to experience a 3D effect that is intended when viewing the recorded 3D picture in the intended viewing environment.

9. A playback apparatus comprising:
    readout means for reading out picture data of a 3D picture and viewing environment information indicating an intended viewing environment for the 3D picture from a recording medium that stores the picture data and the viewing environment information; and
    provision means for acquiring information indicating a current viewing environment and providing a viewer with an adjusted 3D picture approximate to the read-out 3D picture by controlling a viewing function of viewing glasses worn by the viewer on the basis of the viewing environment information indicating the intended viewing environment and the information indicating the current viewing environment, wherein the adjusted 3D picture to be viewed in the current viewing environment enables the viewer to experience a 3D effect that is intended when viewing the read-out 3D picture in the intended viewing environment.

10. The playback apparatus according to claim 9, wherein the provision means displays, on a display unit, information for guiding the viewer to establish the current viewing environment conforming to the intended viewing environment on the basis of the viewing environment information indicating the intended viewing environment and the information indicating the current viewing environment, so as to provide the viewer with the adjusted 3D picture approximate to the read-out 3D picture that can be viewed in the intended viewing environment.

11. The playback apparatus according to claim 9, wherein the provision means performs a predetermined picture process on the read-out picture data on the basis of the viewing environment information indicating the intended viewing environment and the information indicating the current viewing environment, generates data of the adjusted 3D picture approximate to the read-out 3D picture that can be viewed in the intended viewing environment, and makes a display unit display the adjusted 3D picture based on the data.

12. The playback apparatus according to claim 9, wherein the viewing environment information includes a size of a display unit that displays the read-out 3D picture and a viewing distance, which is a distance from the display unit to the viewer.

13. The playback apparatus according to claim 9, wherein the viewing environment information includes an angle in a horizontal direction formed between the viewer and an edge in a horizontal direction of a display unit that displays the read-out 3D picture.

14. A playback method for a playback apparatus, comprising the steps of:
   reading out picture data of a 3D picture and viewing environment information indicating an intended viewing environment for the 3D picture from a recording medium that stores the picture data and the viewing environment information;
   acquiring information indicating a current viewing environment; and
   providing a viewer with an adjusted 3D picture approximate to the read-out 3D picture by controlling a viewing function of viewing glasses worn by the viewer on the basis of the viewing environment information indicating the intended viewing environment and the information indicating the current viewing environment,
   wherein the adjusted 3D picture to be viewed in the current viewing environment enables the viewer to experience a 3D effect that is intended when viewing the read-out 3D picture in the intended viewing environment.

15. A non-transitory computer-readable medium storing a program for causing a computer to execute a process, the process comprising the steps of:
   reading out picture data of a 3D picture and viewing environment information indicating an intended viewing environment for the 3D picture from a recording medium that stores the picture data and the viewing environment information;
   acquiring information indicating a current viewing environment; and
   providing a viewer with an adjusted 3D picture approximate to the read-out 3D picture by controlling a viewing function of viewing glasses worn by the viewer on the basis of the viewing environment information indicating the intended viewing environment and the information indicating the current viewing environment,
   wherein the adjusted 3D picture to be viewed in the current viewing environment enables the viewer to experience a 3D effect that is intended when viewing the read-out 3D picture in the intended viewing environment.

16. A recording apparatus comprising:
   a recording controller configured to record picture data of a 3D picture and viewing environment information indicating an intended viewing environment for the 3D picture on a recording medium,
   wherein the viewing environment information enables a playback apparatus to provide a viewer with an adjusted 3D picture approximate to the recorded 3D picture by controlling a viewing function of viewing glasses worn by the viewer based on the viewing environment information indicating the intended viewing environment and information indicating a current viewing environment, and
   wherein the adjusted 3D picture to be viewed in the current viewing environment enables the viewer to experience a 3D effect that is intended when viewing the recorded 3D picture in the intended viewing environment.

17. A playback apparatus comprising:
   a readout unit configured to read out picture data of a 3D picture and viewing environment information indicating an intended viewing environment for the 3D picture from a recording medium that stores the picture data and the viewing environment information; and
   a provision unit configured to acquire information indicating a current viewing environment and provide a viewer with an adjusted 3D picture approximate to the read-out 3D picture by controlling a viewing function of viewing glasses worn by the viewer on the basis of the viewing environment information indicating the intended viewing environment and the information indicating the current viewing environment,
   wherein the adjusted 3D picture to be viewed in the current viewing environment enables the viewer to experience a 3D effect that is intended when viewing the read-out 3D picture in the intended viewing environment.

18. The recording method according to claim 7, wherein controlling the viewing function of the viewing glasses worn by the viewer comprises controlling an enlargement or reduction ratio of the glasses based on the viewing environment information indicating the intended viewing environment and the information indicating the current viewing environment.

19. The recording method according to claim 14, wherein controlling the viewing function of the viewing glasses worn by the viewer comprises controlling an enlargement or reduction ratio of the glasses on the basis of the viewing environment information indicating the intended viewing environment and the information indicating the current viewing environment.

* * * * *

UNITED STATES PATENT AND TRADEMARK OFFICE
CERTIFICATE OF CORRECTION

PATENT NO.         : 8,675,050 B2                                              Page 1 of 1
APPLICATION NO.    : 12/984218
DATED              : March 18, 2014
INVENTOR(S)        : Sakaguchi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 378 days.

Signed and Sealed this
Second Day of June, 2015

Michelle K. Lee
*Director of the United States Patent and Trademark Office*